United States Patent [19]

Oka et al.

[11] 4,319,670
[45] Mar. 16, 1982

[54] MECHANISM FOR PREVENTING DROPPING OF THE CALIPER DURING WORK ON A PIN-SLIDE TYPE DISC BRAKE

[75] Inventors: Hiroyuki Oka; Shingo Watanabe, both of Toyota; Yusyo Watanabe; Masayuki Kurata, both of Kuki, all of Japan

[73] Assignees: Toyota Jidosha Kogyo Kabushiki Kaisha, Aichi; Akebono Brake Industry Company Limited, Tokyo, both of Japan

[21] Appl. No.: 127,329

[22] Filed: Mar. 5, 1980

[30] Foreign Application Priority Data

Mar. 13, 1979 [JP] Japan .............................. 54-32212[U]

[51] Int. Cl.³ ............................................. F16D 65/02
[52] U.S. Cl. ................................................ 188/73.34
[58] Field of Search ..................... 188/1 R, 73.3, 73.4, 188/73.6, 73.32, 73.33, 73.34; 192/70.13

[56] References Cited

U.S. PATENT DOCUMENTS 3,402,789  9/1968  Henry-Biabaud ................. 188/73.6
3,695,398  10/1972  Crawford ........................... 188/73.6

*Primary Examiner*—Duane A. Reger
*Attorney, Agent, or Firm*—Toren, McGeady & Stanger

[57] ABSTRACT

In a pin-slide type disc brake, the caliper of the disc brake is prevented from dropping or turning on a slide pin due to its own weight during replacement of the friction pads of the disc brake by providing a fitting hole in a part of a support straddling the disc in the radial direction of the disc and in the vicinity of a caliper guide mechanism located on the upper side of the support. A rigid rod is fitted into the hole and arranged to have, for example, the inner wall of the disc straddling portion of the caliper come to engage it to thus prevent the caliper from dropping when it is turned about the slide pin.

5 Claims, 3 Drawing Figures

MECHANISM FOR PREVENTING DROPPING OF THE CALIPER DURING WORK ON A PIN-SLIDE TYPE DISC BRAKE

BACKGROUND OF THE INVENTION

1. Field of the Invention

This invention relates to a pin-slide type disc brake and more particularly to a structural arrangement for the pin-slide type disc brake which prevents a caliper thereof from toppling over during friction pad replacement work.

2. Description of the Prior Art

The pin-slide disc brake of the type having a caliper thereof supported by a support and slidable in the axial direction of a disc through a caliper guide mechanism comprising a pair of slide pins disposed on the left and right sides of the caliper which is arranged to push a pair of friction pads against the disc has been used and tends to be more widely used because the sealing mechanism of the sliding part of the brake can be easily arranged and the brake permits reduction in the weight thereof. In addition to these advantages, the pin-slide type disc brake facilitates friction pad replacement because, when one of the slide pins is removed, the caliper thereof can be turned about the other slide pin for carrying out the friction pad replacing work.

Generally, in a disc brake of this type, the caliper guide mechanism which comprises of pair of slide pins is divided into upper and lower parts as will be understood from the arrangement of the support shown in the accompanying drawings. Referring to FIG. 3, when a vehicle on which the brake is mounted runs forward in the direction as indicated by an arrow F, the disc 1 rotates in the direction as shown by arrow R. In view of this, generally a slide pin 11 which is in the upper part of the caliper guide mechanism 5 is mainly used for reliable mounting of the caliper and the support while another slide pin 13 which is in the lower part of the caliper guide mechanism is used as an auxiliary part in the caliper guide mechanism 6 and is arranged to be easily attachable and detachable. To replace the friction pads 3 in this structural arrangement, the caliper 4 which is arranged to push the friction pads 3 against both sides of the disc 1 is turned about the slide pin 11 disposed in the upper part 5 of the caliper guide mechanism 5 and 6 which slidably supports the caliper 4 in the axial direction of the disc 1 in conjunction with the support 2 after the lower part 6 of the caliper guide mechanism is removed by removing a bolt 12 to disengage the slide pin 13 from the support 2. However, the worker who is replacing the friction pads must keep holding the caliper by hand during the work because the caliper rotates and tumbles down by its own weight.

SUMMARY OF THE INVENTION

It is an object of this invention to provide a pin-slide type disc brake having a caliper tumbling preventing structural arrangement which solves the above stated problem of the conventional pin-slide type disc brake to facilitate friction pad replacing work without requiring the worker to keep holding by hand the caliper during the replacing work on the friction pads.

To attain this object of the invention, a fitting hole is provided in a part of a support straddling the disc in the radial direction thereof in the vicinity of a caliper guide mechanism located on the upper side of the support. Then, in carrying out friction pad replacing work, rigid rod is fitted into the hole to have, for example, the inner wall of the disc-straddling portion of the caliper come to engage it and thus to prevent the caliper from toppling over when the caliper is turned about one of the slide pins during replacement work on the friction pads.

The rigid rod may be either prepared specially for this purpose or a tool such as a screw driver or the like that is carried by the worker may be utilized for this purpose as long as it can be fitted into the fitting hole.

The above and further object, features and advantages of the invention will be apparent from the following detailed description of an embodiment thereof taken in conjunction with the accompanying drawings.

DETAILED DESCRIPTION OF PREFERRED EMBODIMENT

Figure 1:
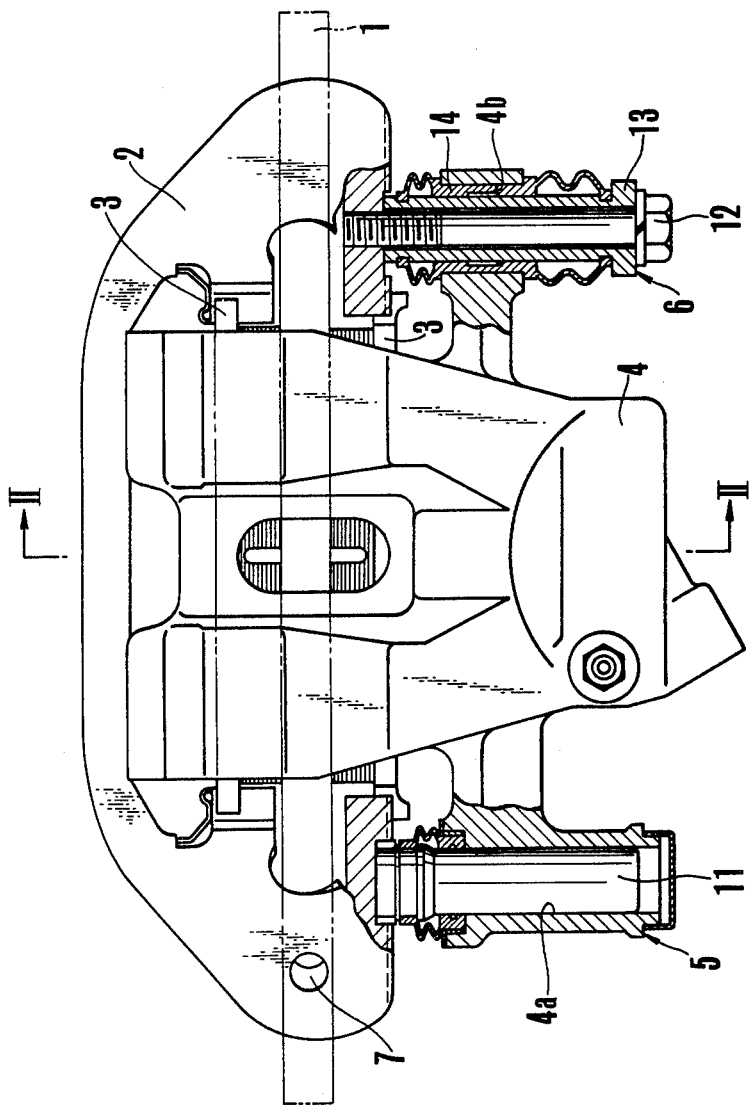
FIG. 1 is a plan view showing a disc brake as embodiment of the present invention.
Figure 2:
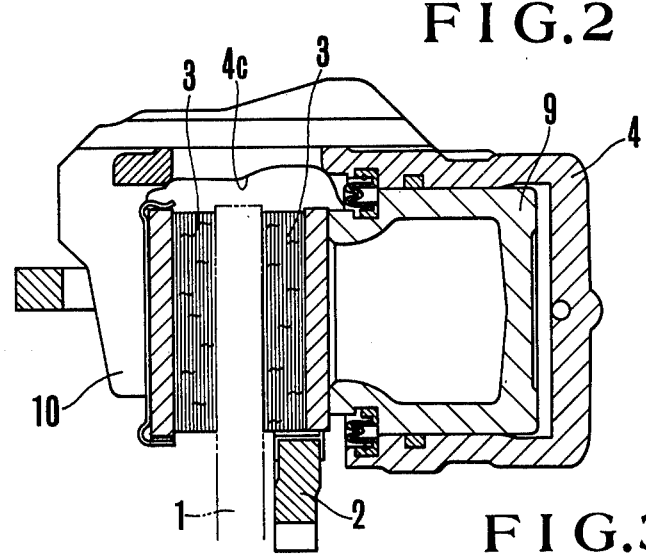
FIG. 2 is a sectional view taken on line II—II of FIG. 1.

The present invention is embodied in a disc brake presented in FIG. 1. A disc 1 is arranged to rotate together with the wheel of a vehicle which is not shown. A support 2 is secured to a fixed structural part of the vehicle in the vicinity of the disc 1. A pair of friction pads is carried by the support 2 and is arranged to confront each other with the disc 1 interposed therebetween. There is provided a caliper 4 which has a hydraulically operated piston 9 incorporated therein on one side of the disc 1 and a reaction part 10 disposed on the other side of the disc 1. A pair of caliper guide mechanisms 5 and 6 are arranged to connect the caliper to the support 2 and to slidably guide it in direction parallel with the axis of the disc.

One guide mechanism 5 has a slide pin 11 secured to the support 2 and a guide hole 4a which is formed in the caliper 4 and is arranged to engage with the slide pin 11. The other guide mechanism 6 has a cylindrical slide pin 13 which is secured to the support 2 by means of a bolt 12 and an elastic bush 14 which is disposed between a guide hole 4b of the caliper 4 and the slide pin 13.

The disc brake which is arranged as described in the foregoing operates as follows:

The piston 9 is operated by hydraulic pressure to thrust the friction pad 3 disposed on the right hand side forward upon one side of the disc 1. A reaction to this thrusting action then causes the caliper 4 to slide over the slide pins 11 and 13 to push the left friction pad 3 against the other side of the disc 1. The frictional force produced at the two friction pads is received by the support 2.

Figure 3:
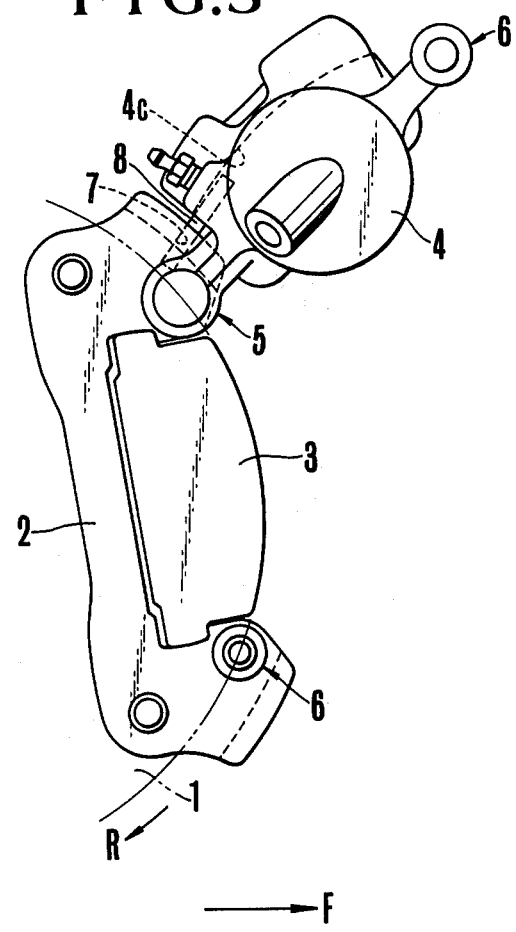
FIG. 3 is an illustration of the caliper tumbling preventing structural arrangement of the invention shown during friction pad replacement.

Referring now to FIGS. 1 and 3, in this disc brake of the invention, a fitting hole 7 is provided in a part of the support 2 straddling the disc in the radial direction thereof and in the vicinity of the caliper guide mechanism 5 located on the upper side of the support 2. Then, in replacing the friction pads 3, a rigid rod 8 is fitted into the hole 7 to have, for example, the inner wall 4c of the disc straddling portion of the caliper 4 come to engage it to prevent the caliper 4 from toppling over when it is turned during the time that the friction pad is being replaced.

The rigid rod 8 is prepared particularly for this purpose, but tools, such as a screwdriver, which are usually carried by the worker or the removed bolt 12 (FIG. 1) may be used. In short, any form of a rod member adapted to be fitted into the hole 7 may be used if it can restrict the rotation of the caliper 4.

This arrangement relieves the worker from the necessity to keep holding the caliper with his hand and eliminates the possibility of dropping of the caliper to injure the worker during his work on the friction pads.

While a specific embodiment of the invention has been shown and described in detail to illustrate the application of the inventive principles, it will be understood that the invention may be embodied otherwise without departing from such principles.

What is claimed is:

1. In a pin-slide type disc brake having a caliper which straddles a portion of the periphery of a disc and is arranged to push friction pads against the disc by sliding in a direction parallel with the axis of the disc, and a support arranged to slidably carry said caliper through a pair of slide pins one of which is removable to permit said caliper to be turned about the other slide pin, the improvement of a caliper tumbling preventing structural arrangement comprising:

that said support is provided with a fitting hole formed therein in the radial direction of said disc; and a rod fitted into the fitting hole to have said caliper come to engage therewith when said caliper is turned about said other slide pin so that the caliper can be prevented from toppling over by further turning on said slide pin.

2. A caliper tumbling preventing structural arrangement according to claim 1, wherein said fitting hole is provided in the vicinity of a part of said support at which said other slide pin is attached to said support.

3. A caliper tumbling preventing structural arrangement according to claim 2, wherein said fitting hole is provided in a part of said support where said support straddles said disc.

4. A caliper tumbling preventing structural arrangement according to claim 3, wherein said rod engages with the inner wall of a disc-straddling part of said caliper.

5. A caliper tumbling preventing structural arrangement according to claim 4, wherein said rod comprises a bolt by means of which said removable slide pin is secured to said support.

* * * * *